United States Patent [19]

Miller

[11] 4,100,147

[45] Jul. 11, 1978

[54] POLYMERIZATION OF ALIPHATIC NITRILES

[75] Inventor: Gordon H. Miller, Littleton, Colo.

[73] Assignee: Texaco Inc., New York, N.Y.

[21] Appl. No.: 621,702

[22] Filed: Oct. 14, 1975

[51] Int. Cl.$^2$ ............................................. C08G 63/00
[52] U.S. Cl. .............................. 528/362; 260/33.4 R; 260/42.14; 428/426; 428/532; 528/361; 528/494; 528/495
[58] Field of Search ...................... 260/78.41

[56] References Cited

U.S. PATENT DOCUMENTS

| | | | |
|---|---|---|---|
| 3,317,484 | 5/1967 | Fritz et al. .................. | 260/78.41 |
| 3,383,332 | 5/1968 | Horn et al. .................. | 260/78.41 |
| 3,763,115 | 10/1973 | Miller .......................... | 260/78.41 |
| 3,775,380 | 11/1973 | Miller .......................... | 260/78.41 |

*Primary Examiner*—Harry Wong, Jr.
*Attorney, Agent, or Firm*—Carl G. Ries; Thomas H. Whaley; Walter D. Hunter

[57] ABSTRACT

Soluble, curable triazine polymers are prepared by first polymerizing an aliphatic nitrile at a temperature of about 80 to about 450° C in the presence of a catalyst such as a metal chloride to form a B-stage polymer, treating the B-stage polymer with a solvent such as diethyl ether to remove unreacted nitrile and finally extracting the soluble, curable triazine polymer from the thus-treated B-stage material with an alcohol, such as methanol. On heating, the soluble triazine polymers can be cured to form thermally-stable, insoluble, infusible polymeric materials.

16 Claims, No Drawings

POLYMERIZATION OF ALIPHATIC NITRILES

BACKGROUND OF THE INVENTION

1. Field of the Invention

This invention relates to a process for the preparation of soluble, curable triazine polymers. More particularly, this invention relates to a process for preparing soluble, curable triazine polymers from aliphatic nitriles having at least two cyano groups.

2. Description of the Prior Art

Johns in U.S. Pat. No. 3,164,555 has described the preparation of a variety of polymeric products from aliphatic dinitriles by heating, for example, perfluoroglutaronitrile, etc. at a pressure of at least 5000 kg/sg. cm and at a temperature above 200° C in the presence of a catalytic amount of a nitrogenous base or by heating the same monomers in the presence of certain metal halides, such as zinc chloride, etc. in a closed vessel at a temperature above 100° C. The perfluoronitrile polymers formed are useful as antifriction drive train elements. Perfluorether dinitriles have also been homopolymerized or copolymerized with other perfluoroether dinitriles or perfluorodinitriles having from 2 to 8 carbon atoms between the nitrile groups, such as perfluorosuberodinitrile, to give easily fabricable resins with high resistance to corrosive chemicals which are good electrical insulators (see Fritz, U.S. Pat. No. 3,317,484).

Of the polymers described in the art, most of them are infusible, hard, resinous materials suitable for only a limited number of industrial applications.

There is a definite need in the art therefore for a process to provide soluble, curable triazine polymers derived from aliphatic polynitriles which can be utilized as coating materials and afterward cured to form insoluble, infusible compositions.

BRIEF DESCRIPTION OF THE INVENTION

This invention relates to a process for preparing soluble, curable polymers which comprises:

(a) heating an aliphatic nitrile having at least two cyano groups in the presence of a catalyst at a temperature of about 80° to about 450° C to form a B-stage triazine polymer, (b) treating the said B-stage polymer with a dialkyl ether to remove unreacted nitrile and (c) extracting the soluble, curable triazine polymer from the thus-treated B-stage polymer by contacting the polymer with a monohydric alcohol. Recovery of the soluble, curable triazine polymer can be accomplished by a number of ways well known in the art, such as evaporation of the alcohol, water washing to remove the alcohol, low temperature vacuum distillation, etc. The recovered product is a solid which can be easily cured at low temperatures to form an insoluble, infusible material.

The soluble polymeric compositions of this invention comprise recurring triazine rings linked together through alkylene groups joined to the carbon atoms of the said triazine rings.

DETAILED DESCRIPTION OF THE INVENTION

PREPARATION OF THE B-STAGE POLYMER

In the first stage of this process a B-stage or partially cured, thermoplastic, triazine polymer is prepared. The reaction is one of trimerization to form triazine rings. The structure of the recurring units of the soluble, curable triazine polymers of this invention is shown below where $R_1$, $R_2$ and $R_3$ may be the same or different alkylene radicals and where $n$ represents the number of units of the polymer.

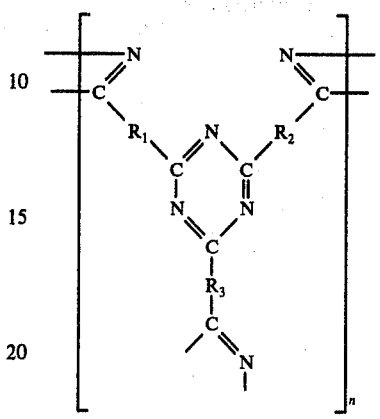

The triazine rings formed in the initial polymerization step can be linked together in a number of patterns. For example, one possible pattern for the polymers prepared by utilizing the process of this invention is shown below as Formula (II) where R is an alkylene group:

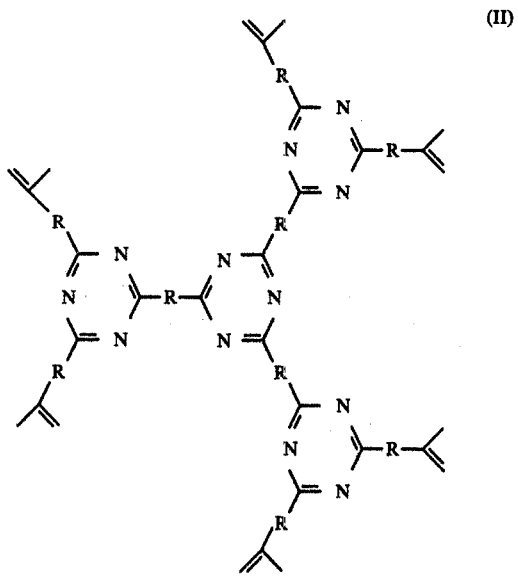

(II)

A wide variety of aliphatic polynitriles including aliphatic dinitriles, trinitriles, etc. may be utilized to form the partially polymerized B-stage products on this invention. Usually, the aliphatic polynitriles employed will have not over 100 carbon atoms and, preferably, not over 35 carbon atoms.

Aliphatic polynitriles useful as starting materials in the process of this invention include compounds of the formula:

where R is an alkylene radical having from 1 to about 50 carbon atoms, and, preferably, from 1 to about 20 carbon atoms. Particularly useful polynitriles include those that have an alkylene chain of from 1 to 8 carbon atoms between the nitrile groups and may be substituted with other innocuous groups such as alkyl of from 1 to 10 carbon atoms as exemplified by methyl, ethyl, propyl, heptyl, octyl, and isomers thereof, amino, nitro, hydroxyl, carboxyl and halogen selected from the group consisting of chlorine, fluorine, iodine, and bromine.

Particularly valuable polymers are prepared by the process of the invention when polynitriles of the formula:

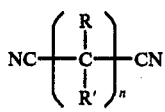

wherein $n$ is an integer of from 1 to 8 inclusive and in each

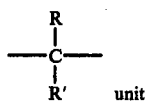 unit

R and R' are independently selected from the group consisting of hydrogen, alkyl of from 1 to 10 inclusive carbon atoms, as exemplified by methyl, ethyl, propyl, butyl, hexyl, heptyl, decyl, and isomers thereof, amino, nitro, hydroxy, carboxy and halogen selected from the group consisting of chlorine, fluorine, bromine and iodine, are utilized as starting materials.

Another particularly preferred group of starting materials for use in the present process include compounds of the formula:

where $n$ is an integer of from 1 to 5. Examples of materials of this group include malonitrile, succinonitrile, glutaronitrile, adiponitrile and pimelonitrile.

Examples of aliphatic polynitriles suitable for use in the process of this invention include:
2-bromomalononitrile
2-iodomalononitrile
2-aminomalononitrile
2-nitromalononitrile
2,2-dichloromalononitrile
2-hydroxymalononitrile
2-n-heptylmalononitrile
2-methyl-2-ethylmalononitrile
2-ethylsuccinonitrile
2-bromosuccinonitrile
2-fluorosuccinonitrile
2-n-octylsuccinonitrile
2-carboxylsuccinonitrile
2,3-dimethylsuccinonitrile
2,3-dinitrosuccinonitrile
2,3-diaminosuccinonitrile
2,3-dihydroxysuccinonitrile
2,3-dimethyl-2,3-diethylsuccinonitrile
2,3,3-trimethylsuccinonitrile
2,3,3-trihexylsuccinonitrile
2,2,3,3-tetramethylsuccinonitrile
2,2,3,3-tetraisobutylsuccinonitrile
2,3-difluoro-2,3-di-tert-butylsuccinonitrile
2-(chloromethyl)-succinonitrile
1,2,2-tricyanoethane
1,1,2,2,-tetracyanoethane
perfluorosuccinonitrile
perchlorosuccinonitrile
2-carboxylglutaronitrile
3-aminoglutaronitrile
2,3-dimethylglutaronitrile
2,3-dinitroglutaronitrile
2,2-dihydroglutaronitrile
2,3-dichloro-4-methylglutaronitrile
2,3-dihydroxyglutaronitrile
2,3,4-tribromoglutaronitrile
2,3,4-triisopropylglutaronitrile
2,2,3,3-tetrafluorglutaronitrile
2,3-dicarboxyglutaronitrile
perfluoroglutaronitrile
3-chloroadiponitrile
3-aminoadiponitrile
3-nitrodiponitrile
3-fluoroadiponitrile
2,2,3-tricyanopropane
2-hydroxyadiponitrile
2-isopropyladiponitrile
2,3-dibromoadiponitrile
2,4-dihydroxyadiponitrile
2,3,4-triethyladiponitrile
2,2,3-trihydroxyadiponitrile
2,3=dichloro-3,4-di-isobutyladiponitrile
2,2,3,3-tetrachloroadiponitrile
perchloroadiponitrile
perfluoroadiponitrile.

Derivatives of pimelonitrile, suberonitrile, sebaconitrile, etc. of the same general types as set forth above are also suitable starting materials in the process of this invention.

Mixtures of the above-mentioned aliphatic polynitriles, such as a mixture of succinonitrile and perfluorosuccinonitrile may be employed if desired. In addition to the examples above, other substituted aliphatic polynitriles can be employed. For example, those containing groups derived from a carboxyl group, such as carboxylic salts, amides and esters thereof, as well as nitrosulfone and sulfonic acid groups. Preparation of the above-described aliphatic nitriles can be accomplished by methods well-known in the art. For example, halogenated derivations of the various aliphatic nitriles can be made by the methods described in U.S. Pat. Nos. 3,502,579 and 3,317,484, etc.

B-STAGE POLYMERIZATION CONDITIONS

The temperature at which the B-stage polymerization reaction of this invention is carried out can be varied widely although generally the temperature utilized will be from about 80° to about 450° C and, preferably, will be from about 150° to about 400° C. Generally, the time of the B-stage polymerization step will range from about 0.1 to about 2.0 hours or more and depending upon the particular nitrile being polymerized and the other reaction conditions being employed. A wide variety of B-stage products result which are, in general, solids at room temperature but at elevated temperature range from highly fluid to viscous materials.

The products formed in the early stages of this process are at elevated temperatures highly fluid, liquid polymers and as the polymerization continues they become soft materials and finally rigid, infusible, insoluble C-stage polymeric product result. Such C-stage compositions must be avoided in the process of this invention since, being highly crosslinked materials they are extremely insoluble materials which exhibit negligible solubility in organic liquids, such as ethers, ketones and aromatic hydrocarbons, such as ethyl-n-propyl ether, methyl isobutyl ketone, diethyl ether, N-methyl-2-pyrrolidone, decalin, p-chlorobenzene, o-chlorobenzene, bromobenzene, aniline, toluene, etc. In contrast curable triazine polymers of this invention are soluble in monohydric alcohols and the dialkyl ethers.

The amount of catalyst employed in preparing the B-stage compositions of this invention can be varied widely. Generally, from about 0.1 to about 5 weight percent of the catalyst based on the weight of the monomer charged to the reactor will be utilized although, preferably, this amount will be from about 0.5 to about 3.5 weight percent on the same basis.

A wide variety of catalysts may be utilized in conducting the process of this invention. Useful catalysts include:

(a) Compounds of non-metals, such as phosphorus pentoxide, non-metal halides, such as phosphorus trichloride, phosphorus tribomide, phosphorus triiodide, phosphorus pentachloride, phosphorus pentabromide, arsenic tribromide, arsenic triodide and arsenic trichloride;

(b) Acids such as sulfuric acid, hydrochloric acid, hydrofluoric acid, fluosulfonic acid, chlorosulfonic acid, etc; and (c) Halides of metals of Groups II, III, IV, V and VIII of the Periodic Table as set forth on page 125 of Mellor's Modern Inorganic Chemistry, Revised Edition, Longmans, Green and Co. Ltd. (1967), such as zinc chloride, aluminum chloride, aluminum iodide, aluminum bromide, ferric chloride, titanium tetrachloride, antimony trichloride, antimony trifluoride, antimony triiodide, boron trichloride, boron trifluoride, arsenic chloride, cuprous chloride, cobalt bromide, vanadium tetrafluoride, manganous bromide, manganic chloride, strontium fluoride, strontium chloride, zirconium tetraiodide, zirconium tetrachloride, stannous chloride, and stannic iodide.

It has been found that the polymerization reaction can be moderated by conducting it in the presence of an inert carrier, such as a paraffin hydrocarbon as exemplified by heptane, octane, isooctane, decane, isodecane, undecane, tridecane, etc. ethylene glycol, 1,2,3,4-tetrahydronaphthalene, 1-methylnaphthalene, biphenyl, etc. Preferably, the boiling point of the liquid carrier will be between about 80° to 450° C. Generally, the carrier employed is one in which the aliphatic polynitrile is essentially insoluble. Carrier liquids, such as ethylene glycol, in which some of the monomers are soluble can also be utilized, if desired. When employing a liquid carrier in the process of this invention, the reactor is operated under sufficient pressure so that the carrier remains in the liquid state or the pressure of the reactor is selected so that the carrier is allowed to boil and reflux.

When a carrier liquid is used in the process of this invention it is found that the dinitrile dispersed in the carrier liquid is heated more uniformly since heat from the reactor wall is more easily transferred to the carrier and then to the monomer. Another advantage of this method is that the use of the carrier tends to minimize agglomertion of the formed polymer which might otherwise cause local overheating due to the exothermic nature of the polymerization reaction and the carrier serves to distribute or disperse the heat generated during the reaction.

Aromatic mononitriles, such as benzonitrile, o-toluonitrile, m-toluonitrile, p-toluonitrile, 2-naphthonitrile, phenylbenzonitrile, p-t-butylbenzonitrile, p-chlorobenzonitrile, m-fluorobenzonitrile, 2,4-dichlorobenzonitrile, p-bromobenzonitrile, etc. and aliphatic mononitriles, such as acetonitrile, propionitrile, n-butyronitrile, isobutyronitrile, n-amylnitrile, isoamylnitrile, etc. and mixtures thereof, may be added to the polymerization reaction mixture, if desired. Such mononitriles serve to moderate the polymerization reaction and to control the molecular weight of the resulting polymeric products. Generally from about 0.1 to about 25 weight percent of the mononitriles based on the weight of the aromatic polynitrile or mixtures thereof charged to the reactor will be used.

REMOVAL OF UNREACTED MONOMER FROM B-STAGE PRODUCT

In the second stage of the process of this invention the unreacted monomer (i.e., the unpolymerized starting nitrile) is removed from the B-stage product by contacting with a dialkyl ether of the formula:

$$R - O - R'$$

where R and R' are independently selected alkyl groups of from 1 to 5 inclusive carbon atoms as exemplified by ethyl, n-propyl, isopropyl, n-butyl, t-butyl, isobutyl, n-amyl, etc. so that we may use ethers such as diethyl, di-n-propyl, diisopropyl, di-n-butyl, n-propylethyl, isopropyl ethyl, n-butyl-n-propyl, etc. The contacting operation is conducted at a temperature of about 20° C to about 100° C and preferably below the boiling point of the ether. Usually, the volume of solvent utilized will be from about 2 to 100 times the bulk volume of the B-stage polymer.

EXTRACTION OF THE SOLUBLE CURABLE TRIAZINE POLYMER

In the third-stage of the process of this invention, the soluble, curable triazine polymer is recovered by contacting the previously treated B-stage material with a monohydric alcohol of the formula:

$$R - OH,$$

wherein R is alkyl of from 1-10 carbon atoms, as exemplified by methyl, ethyl, n-propyl, isopropyl, n-butyl, isoamyl, isohexyl, n-hexyl, n-heptyl, isooctyl, n-decyl, etc. Mixtures of these same alcohols can be used if desired. Generally, the extraction operation will be carried out at temperatures ranging from about 20° C to about 100° C and preferably below the boiling point of the alcohol. The volume of solvent employed in this step will be from about 2 to about 100 or more times the bulk volume of the B-stage material.

The alcoholic solution of the soluble, curable triazine polymer in itself is a valuable product which can be employed in a variety of coating operations. Alternatively, as previously mentioned, the solid polymer may be recovered by evaporating off the solvent.

Curing of the soluble triazine polymers to form thermally stable, insoluble, infusible polymeric materials can be accomplished by heating the polymer at temperatures ranging from about 50° to about 450° C and preferably from about 80° to about 300° C under pressures of from atmospheric up to about 10,000 psig for a period of time ranging from about 10 minutes to about 10 hours or more.

The soluble, curable triazine polymers of this invention can be employed in preparing a wide-range of useful products. For example, they can be utilized in treating textiles such as yarn and cloth of wool, cotton and synthetic fibers; as corrosion resistant coatings for metals such as steel, aluminum, etc. and in the fabrication of films, fibers and a wide variety of molded articles. The soluble curable polymers in a suitable solvent, such as methanol, can be used to coat electrical wires of copper, aluminum, steel, etc. to provide high-temperature insulation.

The curable, polymeric products of this invention can be utilized as coatings for a wide variety of materials which are valuable reinforcing agents for preparing reinforced plastic compositions of high tensile strength. Suitable base plastics include polyolefins such as polyethylene, polypropylene, epoxy resins, phenol-formaldehyde resins, etc. Materials suitable for the preparation of such reinforcing agents include cellulosic fibers, such as cotton fibers, jute, sisal, etc. and siliceous materials such as mineral silicates, etc.

Synthetically prepared siliceous materials are also useful such as fumed silica and silica obtained by evaporation of silica sol. Examples of other useful reinforcing agents include quartz and other forms of silica such as silica gel, glass fiber, cristobalite, etc., mineral silicates such as wollastonite, mullite, sillimanite, asbestos such as chrysotile which is a hydrated magnesium silicate, crocidolite, calcium magnesium silicates, forsterite, magnesium silicate, and clays such as kaolinite, bentonite, montmorillonite, saponite, attapulgite, etc. An especially useful class of reinforcing agents are those prepared by treating glass fiber with one or more of the soluble, curable polymers of this invention dissolved in a suitable solvent.

A wide variety of glass fibers can be employed in preparing the novel reinforcing agents of this invention including yarn, rovings, chopped strand, etc. Chopped strand having lengths ranging from ⅛ to 2 inches or more with diameters ranging from about 0.00012 to about 0.00075 inches or more is an especially useful reinforcement material.

The amount of reinforcing agent utilized in preparing a reinforced plastic can be varied over a wide-range and generally will be from about 0.5 to about 40 percent or more by weight based on the total weight of the composition.

The particle size of the granular reinforcement materials can be varied widely and generally particle sizes which will pass a 60 mesh screen (250 micron in the smallest dimension) are small enough to be used in the compositions of this invention, although particles as large as 1000 microns (18 mesh) can also be employed.

The reinforcing agents of this invention can be prepared by treating the starting reinforcement material with the soluble, curable triazine polymer in such a manner that the said agent retains as a thin film or coating a small amount of the polymer adsorbed directly on its surface or on a preliminary polymeric coating adhered to the surface of the reinforcing agent. This can be carried out by treating the reinforcing material with the molten triazine monomer itself or by contacting the reinforcement material with a hot (i.e., at about 35° C to about 100° C) solution of the polymer in an inert liquid, such a monohydric alcohol having 1 to 10 carbon atoms as exemplified by methanol, ethanol, hexanol, etc. Generally, the concentration of the polymer in the solution will range from about 0.05 to about 20 grams per liter and, preferably, it will be from about 0.1 to about 10 grams per liter. After the reinforcing material and the polymer solution have been thoroughly mixed, the treated reinforcing material can be separated from any excess of the triazine polymer or from the solution of said polymer by various methods, such as be decantation or by filtering, or the solvent can be allowed to evaporate or be driven off by heat so as to concentrate the polymer material on the surface of the reinforcing agent. Subsequently, in the case in which a solvent is employed, the treated reinforcing agent is dried to remove excess solvent and then cured to form an adherent coating on the reinforcing material, preferably at a temperature of about 125° to about 300° C under pressure of from atmospheric up to about 10,000 psig. Afterwards, the reinforcing agent having adsorbed and/or coated directly on its surface a small amount of the triazine polymer can be (i.e., about 0.05 to about 5.0 weight percent) incorporated in a polymer; such as a polyolefin composition by any of several well-known in the art such as by using an internal mixer, or by employing a differential roll mill, etc. to form a reinforced plastic of high tensile strength.

The reinforced thermoplastic composition may contain other materials in addition to the polymeric base material (e.g., a polyolefin and the reinforcement agent coated with the triazine polymer) such as dyes, heat stabilizers, light stabilizers, antioxidants and other modifiers provided the amount of the additional modifier is such as to not produce an unduly adverse effect upon the final properties of the thermoplastic composition.

EXAMPLE I

A stirred reactor is charged with 150 g. of succinonitrile, 3 g. of $Z_nCl_2$ and 207.6 g. of n-dodecane. The dodecane is used as a carrier liquid to help control the heat transfer to the polymerization reaction and minimize local hot spots which tend to cause too rapid a reaction. The reactor which is heated by means of a silicone bath is maintained at a temperature of 200°–210° C. for 15 minutes and then quickly quenched in a cooling bath. The reactor is then opened, the dodecane is decanted off, all carrier liquid is removed by several washed with petroleum ether (ligroin), and the residual material is dried and weighed. The polymeric reaction mass, freed of the hydrocarbon carrier weighs about 155 grams.

The thus-formed B-stage triazine polymer is extracted at a temperature of about 20° C by contacting it with diethyl ether (300 ml) to remove unreacted succinonitrile. Insoluble material from the ether extraction is dried and is found to weigh about 105 g. for a yield, basis original succinonitrile charge, of approximately 70%. Ether from the extract is removed by evaporation and condensation for reuse. The dried extract which weighs about 45 grams (yield 30%) is shown by infrared analysis to be about 80 weight percent succinonitrile with the remainder being a soluble triazine polymer.

The B-stage material, after extraction with diethyl ether, is further extracted with anhydrous methanol. A 100 gram sample is stirred with 400 ml. of warm methanol and the soluble portion is decanted through a filter. The insoluble, B-stage material, after drying, is found to weigh about 64.6. The methanol extract following treatment to remove the methanol by evaporation yields about 16.5 g. of solid, soluble triazine polymer product.

Infrared analysis of the polymer confirms the presence of the triazine ring together with some unreacted succinonitrile. The soluble triazine polymer recovered can be further purified by repeating the methanol extraction process outlined above.

EXAMPLE II

Glass fiber (⅛ inch chopped No. 816 fiber, diameter: about 0.00050 in.) is soaked in a methanol solution of the soluble triazine polymer prepared in Example I (0.05 weight percent polymer) for about 0.5 hours at a temperature of about 45° C. The solution and contained fiber are then cooled to room temperature at which point the excess liquid is decanted and the wet fibers are then dried in an oven at about 135° C. During the drying period the polymeric coating is cured to a tough, tightly adhering film or coating on the fiber surface.

A reinforced polymeric composition is prepared on a two roll using 20 grams of the above-described coated fiber and 100.00 grams of low density polyethylene. The composition is made by pouring low density polyethylene pellets into the nip between the hot rolls in increments until the polymer is molten after which the triazine-coated glass fiber reinforcement is added to the nip, the resulting composition is milled for about 0.6 hours yielding a reinforced polyethylene composition which exhibits a high tensile strength.

EXAMPLE III

Alpha-cellulose (100 mesh flock) is soaked in a 5 weight percent methanol solution of the soluble triazine polymer prepared in Example I for about 0.6 hours at 35° C. The excess polymer solution is then decanted off and the wet alpha-cellulose fibers are dried by tumbling in a hot air rotary drier operated at a temperature of about 100° C. The dry product is alpha-cellulose coated with a cured, tightly adhering film of the triazine polymer.

Using the same technique as described in Example II a reinforced plastic composition consisting of about 10 weight percent of the triazine coated alpha-cellulose previously prepared with the balance being ABS polymer is prepared. This material after being fabricated into sheets of ¼ in. thickness is tested and found to have a tensile strength substantially higher than that of the ABS alone.

What is claimed is:

1. A process for preparing a soluble, curable triazine polymer which comprises:
   (A) preparing a partially cured, thermoplastic triazine polymer by heating an aliphatic polynitrile of the formula:

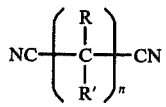

wherein $n$ is an integer of from 1 to 8 inclusive and in each

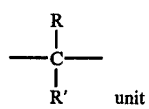
unit

R and R' are independently selected from the group consisting of hydrogen, alkyl of from 1 to 10 inclusive carbon atoms, amino, nitro, hydroxyl, carboxyl and halogen, at a temperature of about 80° to about 450° C in the presence of a catalyst selected from the group consisting of:
   (a) phosphorous pentoxide, phosphorous trichloride, phosphorous pentachloride, arsenic trichloride, or arsenic pentachloride;
   (b) hydrochloric acid, hydrofluoric acid, fluosulfonic acid, chlorosulfonic acid; or
   (c) halides of metals of Groups, II, III, IV, V or VIII of the Periodic Table as set forth on page 125 of Mellor's Inorganic Chemistry, Revised Edition 1967,
   (B) contacting the said partially cured, thermoplastic triazine polymer with a solvent of the formula:

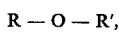

where R and R' are independently selected alkyl groups from 1 to 5 carbon atoms in order to extract therefrom the unreacted polynitrile;
   (C) extracting the soluble, curable triazine polymer as an alcoholic solution by contacting the thus-treated partially cured thermoplastic triazine polymer with a monohydric alcohol, and
   (D) recovering the soluble, curable triazine polymer from said alcohol solution and wherein from about 0.1 to about 5.0 weight percent of said catalyst is employed based on the weight of the polynitrile.

2. The process of claim 1 wherein step (B) is conducted at a temperature of from about 20° C to about 100° C.

3. The process of claim 1 wherein step (C) is conducted at a temperature of from about 20° C to about 100° C.

4. The process of claim 1 wherein the said aliphatic polynitrile has the formula:

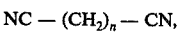

wherein $n$ is an integer of from 1 to 5 inclusive.

5. The process of claim 1 wherein said aliphatic polynitrile is malononitrile.

6. The process of claim 1 wherein the said aliphatic polynitrile is succinonitrile.

7. The process of claim 1 wherein the said aliphatic polynitrile is glutaronitrile.

8. The process of claim 1 wherein the said catalyst is zinc chloride.

9. The process of claim 1 wherein the said catalyst is selected from the group consisting of ferric chloride, titanium tetrachloride, aluminum chloride, antimony trichloride, arsenic trichloride, arsenic pentachloride, boron trichloride, phosphorus trichloride, phosphorus pentachloride, tin tetrachloride, vanadium chloride and zirconium chloride.

10. The process of claim 1 wherein the said aliphatic polynitrile is heated in the presence of an inert carrier.

11. The process of claim 1 wherein the said aliphatic polynitrile is heated in the presence of an inert carrier having a boiling point of from about 80° to about 450° C and under refluxing conditions.

12. The process of claim 10 wherein the said inert carrier is a paraffin hydrocarbon.

13. The process of claim 10 wherein the said inert carrier is undecane.

14. The process of claim 10 wherein the said inert carrier is dodecane.

15. The process of claim 1 wherein in (B) the said solvent is diethyl ether.

16. The process of claim 1 wherein in (C) the said alcohol is methanol.

* * * * *